United States Patent
Ballauf et al.

(10) Patent No.: US 7,395,806 B2
(45) Date of Patent: Jul. 8, 2008

(54) RECIPROCATING INTERNAL-COMBUSTION ENGINE WITH DIRECT FUEL INJECTION BY MEANS OF AN INJECTOR ARRANGED ON THE INTAKE SIDE

(75) Inventors: Jorg Ballauf, Wettstetten (DE); Jose Geiger, Hauset (BE); Martin Winter, Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 109 days.

(21) Appl. No.: 11/438,523

(22) Filed: May 22, 2006

(65) Prior Publication Data
US 2006/0260584 A1 Nov. 23, 2006

(51) Int. Cl.
- F02B 31/00 (2006.01)
- F02F 3/26 (2006.01)
- F02B 3/00 (2006.01)

(52) U.S. Cl. ............... 123/263; 123/276; 123/301; 123/307

(58) Field of Classification Search ......... 123/263, 123/276, 279, 301–302, 307–308, 298
See application file for complete search history.

(56) References Cited

U.S. PATENT DOCUMENTS

| | | | |
|---|---|---|---|
| 5,115,774 A * | 5/1992 | Nomura et al. ............ | 123/276 |
| 6,158,410 A * | 12/2000 | Piock et al. ............... | 123/301 |
| 6,223,715 B1 * | 5/2001 | Suzuki ...................... | 123/294 |
| 6,494,178 B1 * | 12/2002 | Cleary et al. .............. | 123/276 |
| 6,612,282 B2 * | 9/2003 | Yu ............................ | 123/262 |
| 6,892,695 B2 * | 5/2005 | Schmitz et al. ........... | 123/295 |
| 6,928,997 B2 * | 8/2005 | Yu ............................ | 123/657 |
| 2003/0056748 A1 | 3/2003 | Yu | |

FOREIGN PATENT DOCUMENTS

| | | |
|---|---|---|
| EP | 0997622 | 5/2000 |
| EP | 1069291 | 1/2001 |
| EP | 1245819 | 10/2002 |
| WO | WO01/49996 | 7/2001 |

* cited by examiner

*Primary Examiner*—Hai H Huynh
(74) *Attorney, Agent, or Firm*—Gifford, Krass, Sprinkle, Anderson & Citkowski, P.C.

(57) ABSTRACT

A reciprocating internal-combustion engine having at least two gas intake ports (3) with gas intake valves (6), at least one gas exhaust port (4) with a gas exhaust valve (7) and at least one ignition device (14) per cylinder (1) is provided. The engine can also include a combustion chamber (1.1) formed by a cylinder cover (2.1) and a crown (11.1) of a piston (11). A trough-shaped recess (12) can be provided in the piston crown (11.1) and is bounded by a trough base (12.1) and side walls (16). The recess (12) can intersect a roof ridge (11.2) on the piston crown (11.1) and the trough base (12.1) slopes towards a fuel injection nozzle (8) and ends in a wall zone (12.2) extending steeply upwards on its side facing the fuel injection nozzle (8).

13 Claims, 3 Drawing Sheets

RECIPROCATING INTERNAL-COMBUSTION ENGINE WITH DIRECT FUEL INJECTION BY MEANS OF AN INJECTOR ARRANGED ON THE INTAKE SIDE

RELATED APPLICATIONS

This application claims priority of PCT Application No. PCT/EP 2004/013171 filed Nov. 19, 2004, and German Patent Application No. 103 54 682.0 filed Nov. 22, 2003.

BACKGROUND OF THE INVENTION

In reciprocating internal-combustion engines with spark ignition and direct fuel injection, the fuel is injected directly into the working space of the engine by means of an injector. With respect to the time of this injection, there are two basic operating modes.

In so-called homogeneous operation, the fuel is injected early into the combustion chamber, in general during the inflow of the combustion air, i.e. when the intake valve is open. Good homogenisation of the fuel/air mixture is thereby achieved. This operating mode is favourable when the engine is operating at high load.

In so-called stratified-charge operation, injection does not take place until after the gas intake valve has closed, when the piston passes into the region of its top dead centre position during its upwards movement. The intention here is that the fuel is only mixed with some of the fresh air contained in the cylinder and also only in a locally limited manner before it is ignited by the ignition device. This operating mode is preferably employed when the engine is operating at partial load or no load. The advantage is that the engine can be operated without throttling the intake air and without the fuel-to-air ratio in the vicinity of the ignition device being too lean for reliable ignition.

For these operating modes, different methods of introducing the fuel into the cylinder chamber and forming the mixture have become known and can be divided into two categories:

In the so-called jet-guided methods, the injection jet is aimed directly at the ignition device. The injected fuel cloud mixes with the combustion air and is ignited by the ignition device. Accordingly, reliable stratified-charge operation is only ensured if the ignition device is positioned very close to the injector. This has the disadvantage that only an extremely small, operating-point-specific ignition window is available and, accordingly, adjustment of the jet diffusion for large performance characteristic ranges is critical. In addition, the injectors used have to be manufactured with great precision. Even small tolerances or changes in the injector during long-term operation lead to disadvantageous boundary conditions for ignition.

The ignition conditions in stratified-charge operation can therefore only be ensured by an exact geometric relationship between the ignition device and the injection jet. Consequently, the known methods in this category are carried out without a defined or strong charge movement. In homogeneous operation, however, this movement for improving the homogenisation of the fuel/air mixture is absent, resulting in output losses and an increase in fuel consumption with correspondingly increased pollutant emissions.

This method has the further disadvantage of increased wear and shortened life of the ignition devices caused by direct injection onto the ignition device.

The so-called wall-guided methods are based on the fact that, in stratified-charge operation, the fuel injection jet is deflected onto the injection device by the part of the combustion chamber wall formed by the piston crown. This is assisted by a strong charge movement. This method avoids direct injection onto the ignition device. Tolerances and the operating state of the fuel injectors are less critical than in the above-described jet-guided methods.

A disadvantage of these methods is that, when the fuel is injected directly into the cylinder chamber, it travels as far as a combustion chamber wall, in particular the piston crown, with the result that in certain operating states there is incomplete combustion, leading to increased emission of unburned hydrocarbons and increased emission of soot. This method has hitherto been carried out with a fuel injector on the intake side and, from the point of view of orientation and direction of rotation, is based on the formation of a specific cylindrical flow of the cylinder charge in the injection direction, which guides the mixed jet to the ignition device via the piston crown. This pattern of the charge movement can be achieved by steeply upright intake ports (EP 0 558 072 B1 and DE 197 08 288 A1), resulting in a correspondingly greater overall height of the engine. According to another proposed solution, the desired movement pattern of the cylinder charge is achieved by a particular formation of the intake port or, for example, the geometry in the seat region of the intake valve (EP 0 463 613 B1), although this has disadvantageous effects on the flow quality of the intake system and thus on the full-load operation of the engine. In both cases, the injection jet is aimed at a recess in the piston crown so that, during stratified-charge operation, fuel which is still liquid strikes the piston crown. The mixture forming there is then guided towards the ignition device in contact with the wall of the piston crown.

With this method, the strong charge movement necessary in stratified-charge operation has a disadvantageous effect during homogeneous operation owing to the resulting harsh combustion noises and increased wall heat losses.

WO01/49996A discloses a reciprocating internal-combustion engine having two gas in-take ports with gas intake valves and at least one gas exhaust port with a gas exhaust valve and at least one ignition device per cylinder, and having a combustion chamber formed by the cylinder cover and the crown of the piston, which is guided in the cylinder in a reciprocating manner, wherein the piston crown on the one hand and the cylinder cover on the other hand are substantially roof-shaped in vertical section, and wherein in each case one of the roof surfaces is associated with the gas intake valves and the other roof surface is associated with the gas exhaust valve, and the orientation of the roof surfaces of the cylinder cover corresponds to the orientation of the roof surfaces of the piston crown. A trough-shaped recess is provided in the piston crown and extends over the region of the roof ridge on the piston crown and thus over both roof surfaces. The fuel injection nozzle opens into the cylinder near the inlet region of the gas intake port next to the gas intake valve. The ignition device is arranged in the cylinder cover close to the vertical cylinder axis.

Owing to the roof-shaped formation of the cylinder cover and also the piston crown, a combustion chamber is formed which is only slightly creviced so that, in conjunction with the trough-shaped recess in the piston crown, movement of the cylinder charge towards the fuel injection nozzle is produced. As the gas intake ports open into the combustion chamber at an angle, a tumble flow is formed during the intake stroke and initially flows into the combustion chamber along the cylinder cover and is then guided back towards the fuel injection nozzle by the trough-shaped recess. The flow is also maintained during the compression stroke.

In particular during stratified-charge operation, air is guided towards the fuel injection nozzle via the piston crown, and the fuel is then injected into the air. Improved mixture preparation is achieved in the immediate vicinity of the gas intake valve if, during stratified-charge operation, fuel injection takes place after closure of the intake valve at a time at which the piston is close to its top dead centre position during its upwards movement. In the region of the injection valve, the air flow changes direction and is guided towards the ignition device. In spite of the reduced combustion chamber volume, a long free jet path with optimum mixture formation is then available for the fuel in the direction of the air flow in the cylinder towards the ignition device. This produces only a slight coating of fuel on the cylinder walls. The particular formation of the combustion chamber in combination with the position of the fuel injection nozzle permits very flat guiding of the jet, enabling the fanned-out jet to enter the combustion chamber in the region of the trough-shaped recess in the piston crown in a satisfactory manner and almost without wetting the piston crown, also during stratified-charge operation, so that an optimum fuel/air mixture reaches the ignition device.

SUMMARY OF THE INVENTION

The object of the invention is to provide further improvement of the ignition conditions, in particular at partial load, and to reduce the pollutant emissions in a reciprocating internal-combustion engine of the above-described type with spark ignition and direct injection.

According to the invention, this object is achieved by a reciprocating internal-combustion engine having at least two gas intake ports with gas intake valves, at least one gas exhaust port with a gas exhaust valve and at least one ignition device per cylinder, and having a combustion chamber formed by the cylinder cover and the crown of the piston, which is guided in the cylinder in a reciprocating manner, into which combustion chamber the gas intake ports open at a flat angle, measured in relation to the cylinder-head plane, wherein the piston crown on the one hand and the cylinder cover on the other hand are substantially roof-shaped in vertical section, wherein in each case one of the roof surfaces is associated with the gas intake valves and the other roof surface is associated with the gas exhaust valve, and the orientation of the roof surfaces of the cylinder cover corresponds to the orientation of the roof surfaces of the piston crown, and having a fuel injection nozzle opening into the cylinder near the inlet region of the gas intake ports between the gas intake valves, wherein, measured in relation to the cylinder axis, the angle of the jet axis of the fuel injection nozzle is greater than the angle of the gas intake ports, and having an ignition device arranged in the cylinder cover close to the cylinder axis, and having a trough-shaped recess which is provided in the piston crown and is bounded by a trough base and side walls and which intersects the roof ridge on the piston crown and extends over the region of both roof surfaces, the trough base being inclined towards the fuel injection nozzle and ending in a wall zone extending steeply upwards on its side facing the fuel injection nozzle, wherein the transition region between the trough base and the side walls has a substantially barrel-shaped contour in plan view, which first widens on both sides from the gas exhaust side and then narrows again towards the gas intake side, one end of which is formed by the wall zone extending steeply upwards.

The barrel-shaped formation of the side walls gives a more open shape of the piston trough, which leads to less wall contact by the injection jet and thus to lower pollutant emissions, in particular to reduced soot formation in homogeneous operation. At the same time, improved combustion stability is achieved in stratified-charge operation, i.e. misfiring is reduced.

As the trough-shaped recess in the piston crown assists and guides the tumble flow in the manner of a channel, the barrel-shaped contour provided according to the invention has an effect transversely to the main flow direction. In the vicinity of the piston crown, the tumble flow is first expanded slightly transversely to the flow direction, i.e. slowed down slightly, and then consolidated again, i.e. accelerated, immediately before the transition to the wall zone extending steeply upwards. In this way, turbulence is imparted to the tumble flow, which leads to better mixing of the quantities of fuel injected into the air flow and thus to better combustion and a considerable reduction in pollutant emissions, in particular soot particles, in the exhaust gas. This effect is produced in both homogeneous operation and stratified-charge operation.

It is advantageously provided that the trough base has a planar surface and in that the side walls defining the barrel-shaped contour adjoin the trough base in a dish-shaped manner.

In a further advantageous embodiment, it is provided that the end region, facing the gas exhaust port, of the trough-shaped recess is wider than the end region facing the gas intake port and bounded by the steep wall zone.

BRIEF DESCRIPTION OF THE DRAWINGS

Further features and advantages of the invention will become apparent from the following description of an embodiment. In the schematic drawings.

DETAILED DESCRIPTION OF THE INVENTION

Figure 1:
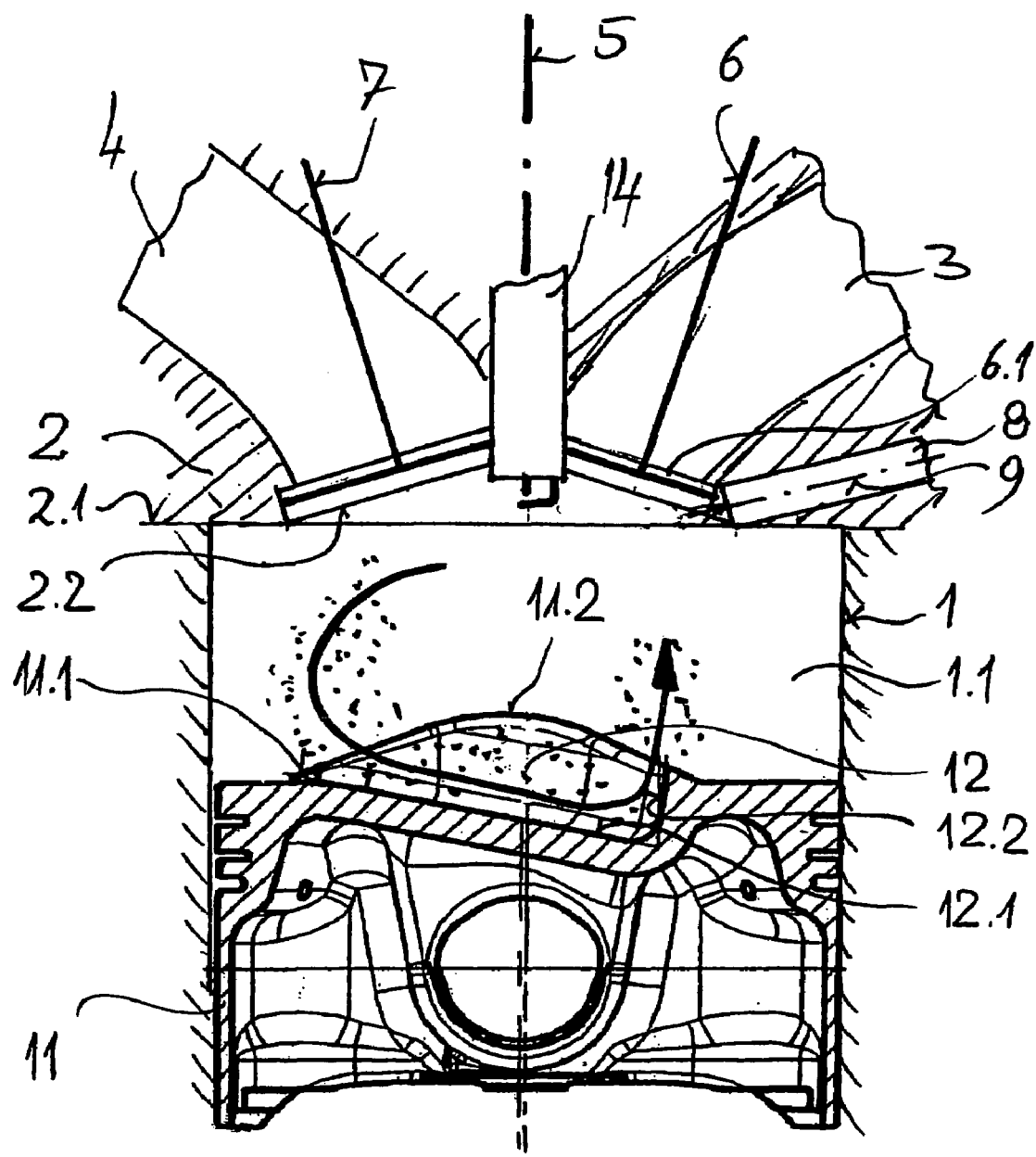
FIG. 1 shows a vertical section through a cylinder, showing the charge movement at the start of the compression stroke during homogeneous operation.

The cylinder 1, shown in FIG. 1, of a reciprocating internal-combustion engine is provided with a cylinder head 2 having two obliquely extending gas intake ports 3 and two gas exhaust ports 4 arranged substantially mirror-symmetrically thereto. As can be seen from the vertical section according to FIG. 1, both the gas intake ports 3 and the gas exhaust ports 4 are arranged in the cylinder head 2 so that they open into the cylinder chamber 1.1 at an angle of less than 45° (measured in relation to the cylinder-head plane 2.1). The gas intake ports 3 are openable and closable by corresponding gas intake valves 6, and the gas exhaust ports 4 are openable and closable by corresponding gas exhaust valves 7.

A fuel injection nozzle 8 is arranged in the cylinder head 2 in the region of the gas intake valves 6 and may be part of a high-pressure direct fuel injection system in common-rail technology. In the embodiment shown here with two gas intake ports 3, the fuel injection nozzle 8 is arranged between the two gas intake valves 6. The fuel injection nozzle 8 opens into the cylinder chamber 1.1 approximately at the level of the lower edge of the valve seat ring 6.1 defining the respective intake openings. The jet axis 9 of the fuel injection nozzle 8 is directed towards the cylinder axis 5 and also extends at an angle thereto 25 which, however, is greater than the entry angle of the gas intake ports 3, measured in relation to the vertical, so that the jet axis extends into the cylinder chamber at a very flat angle.

In the embodiment shown here, both the cylinder cover 2.2 and the crown 11.1 of the piston 11 are roof-shaped, the corresponding roof surfaces being associated with the gas intake valves 6 and the gas exhaust valves 7. A trough-shaped recess 12, which is directed towards the fuel injection nozzle 8, is provided in the piston crown 11.1 and extends through both "roof surfaces" transversely to the "roof ridge" 11.2.

FIG. 1 shows the position of the piston 11 during the compression stroke in homogeneous operation after fuel has been injected by the fuel injection nozzle 8 into the fresh air stream flowing into the combustion chamber along the roof surface on the exhaust side in a tumble flow (cf. arrow) during the downwards movement of the piston 11 when the gas intake valve 6 is open.

During homogeneous operation, i.e. at high load, a fanned-out injection jet 13 is injected through the fuel injection nozzle 8. After closure of the gas intake valve 6, the tumble flow guides the cylinder charge (air and fuel) during the upwards movement of the piston to form a homogeneous fuel/air mixture, the combustion of which is then initiated by the ignition device 14. The effect of the trough-shaped recess 12 with its barrel-shaped contour is 10 also of significance in this operating mode, as will be described in further detail hereinafter. The transverse movement, even if slight, imparted to the fuel/air mixture guided directly by the barrel-shaped trough results in improved preparation, which leads to improved combustion. In particular, the soot formation is considerably reduced. The high flow values of the intake system, which are necessary for a high specific output, are not affected.

The formation of the tumble flow in the cylinder chamber 1.1 can be further influenced by the arrangement of a controllable adjusting member (not shown here) arranged in the gas intake ports 3. Depending on the arrangement and the position of the adjusting member, a stronger (with closed adjusting member for stratified-charge operation) or weaker (with open adjusting member for homogeneous operation) tumble flow is generated in the cylinder chamber 1.1. The effect of the controllable adjusting member can be further increased by the arrangement of a partition orientated transversely to the cylinder axis 5 in at least one gas intake port 3, the partition dividing the gas intake port 3 into an upper sub-port and a lower sub-port.

Figure 2:
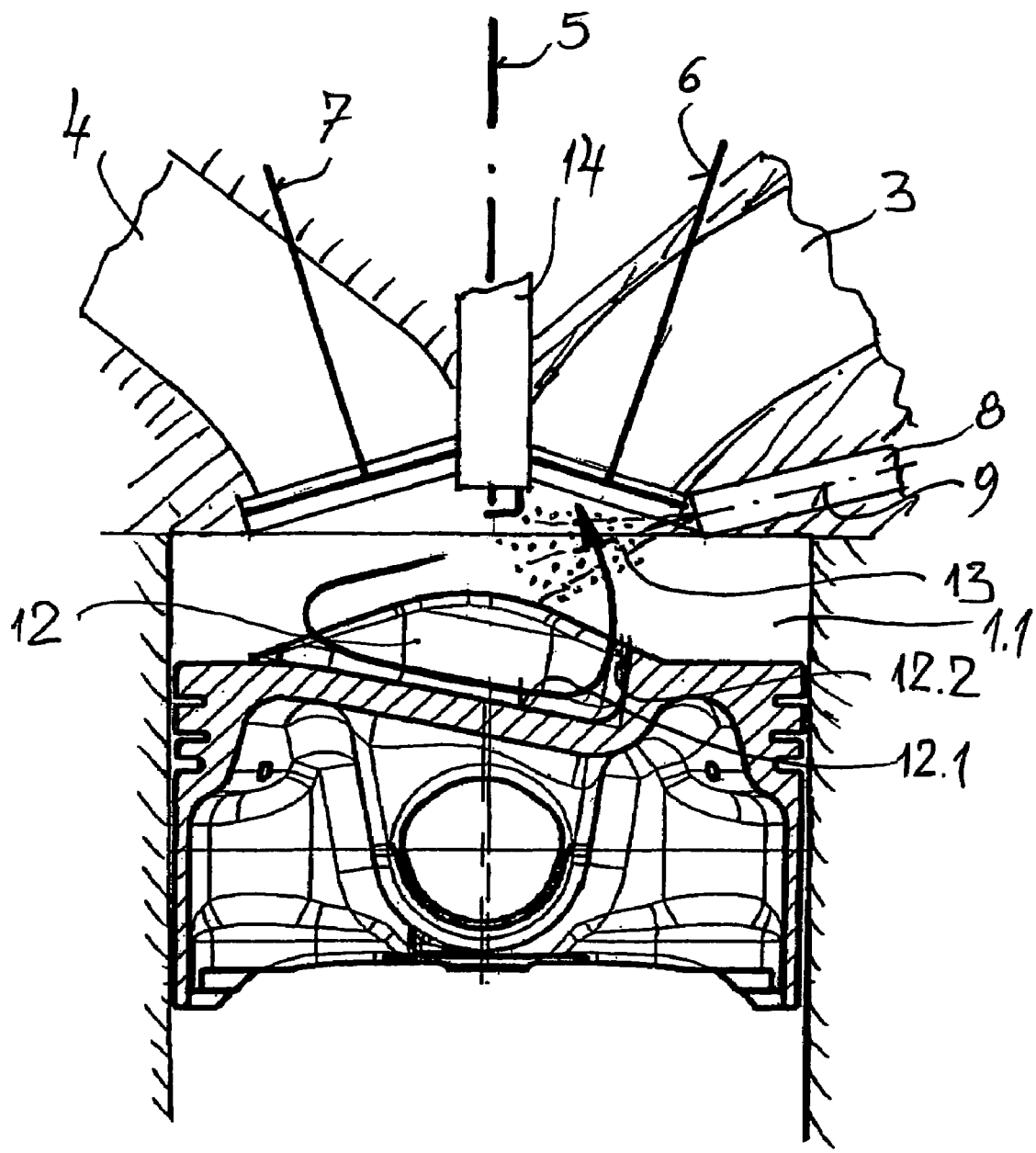
FIG. 2 shows a vertical section through the cylinder with injection during stratified-charge operation.

FIG. 2 shows the position of the piston 11 in the cylinder chamber 1.1 and the flow path at the time of injection for so-called stratified-charge operation, i.e. for operation from no load to partial load. In this case, the fuel jet 13, which is fanned out by corresponding nozzle 30 formation, is injected through the fuel injection nozzle 8 into the cylinder chamber with closed gas exchange valves 6 and 7. The tumble flow generated by the intake stroke is now assisted during the upwards movement of the piston 11 by the trough-shaped recess 12 in the piston crown 11.1, with the trough base 12.1 sloping down towards the gas intake side, so that an upward component of the tumble flow, which is directed towards the cylinder cover and struck by the fuel jet, is also maintained in front of the mouth of the fuel injection nozzle 8 towards the end of the compression stroke. The transverse effects on the tumble flow, caused by the barrel-shaped formation of the recess 12, are at least maintained.

In this case, the fuel jet 13 is picked up by the turbulent air flow, substantially without direct contact with the base of the recess 12, and consequently deflected towards the ignition device 14 by the side of the gas intake valves 6, forming an ignitable mixture in the tumble flow, and ignited. The controlled charge movement in combination with late injection times during compression is utilised to premix fuel and air in a locally limited manner and convey it as an easily ignitable mixture into the vicinity of the ignition device. After combustion has been initiated, the air from the adjacent regions of the charge assists combustion in accordance with the movement of the charge.

Figure 3:
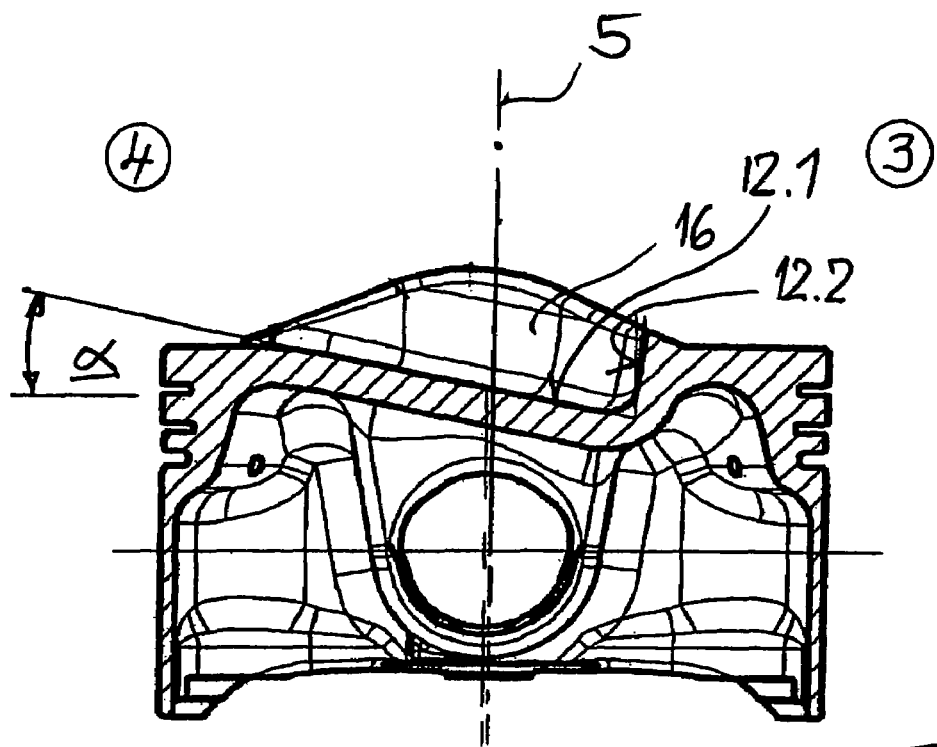
FIG. 3 shows a section through a piston.
Figure 4:
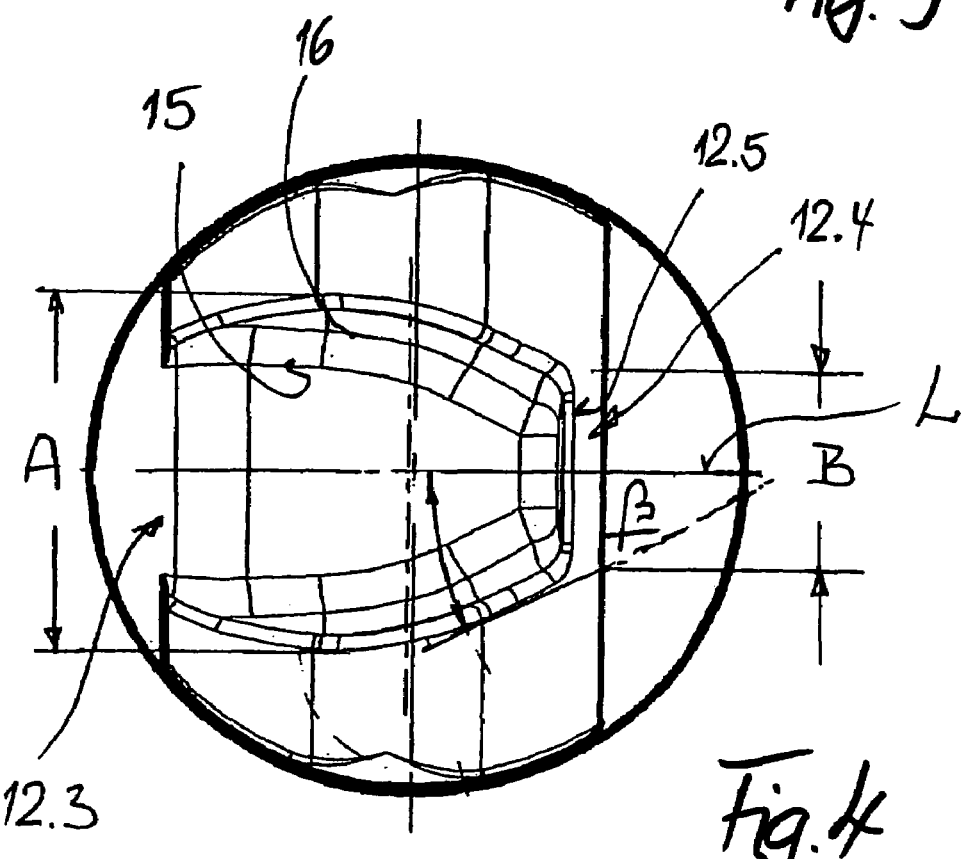
FIG. 4 shows a plan view of the piston crown of one embodiment.

The formation of the piston crown according to the invention is shown in FIGS. 3 and 4. The trough base 12.1, which slopes at an angle a of approximately 12° to the horizontal from the gas exhaust side (designated by the reference numeral 4) towards the gas intake side (designated by the reference numeral 3), ends in a wall zone 12.2 extending steeply upwards on its side facing the fuel injection nozzle 8. As a result, the tumble flow is deflected sharply upwards before reaching the mouth of the fuel injection nozzle 8, as indicated by the arrow in FIG. 2.

The trough-shaped recess 12 has the shape shown in FIG. 4. In this case, the transition region 15 to the trough base 12.1, which has a planar surface, forms, together with the substantially dish-shaped side walls 16, a substantially barrel-shaped contour which first widens on both sides from the gas exhaust side 4 and then narrows again towards the gas intake side 3.

The end region 12.3, facing the gas exhaust side 4, of the trough-shaped recess 12 is wider than the end region 12.4 facing the gas intake side 3 and bounded by the steep wall zone 12.2. The upper boundary contour of the two sides is substantially circular in plan view, as shown in FIG. 4, and extends at an angle β of approximately 25°—measured in relation to the longitudinal axis L of the trough-shaped recess—to the steep wall zone 12.2, the upper boundary edge 12.5 of which extends in a straight line.

The greatest width A of the upper boundary contour may be 1.8 to 1.9 times the width B of the trough in the end region located at the boundary edge 12.5.

The invention claimed is:

1. A reciprocating internal-combustion engine having at least two gas intake ports (3) with gas intake valves (6), at least one gas exhaust port (4) with a gas exhaust valve (7) and at least one ignition device (14) per cylinder (1), and having a combustion chamber (1.1) formed by the cylinder cover (2.1) and the crown (11.1) of the piston (11), which is guided in the cylinder (1) in a reciprocating manner, into which combustion chamber the gas intake ports open at a flat angle, measured in relation to the cylinder-head plane (2.1), wherein the piston crown (11.1) on the one hand and the cylinder cover (2.1) on the other hand are substantially roof-shaped in vertical section, wherein in each case one of the roof surfaces is associated with the gas intake valves (6) and the other roof surface is associated with the gas exhaust valve (7), and the orientation of the roof surfaces of the cylinder cover (2.1) corresponds to the orientation of the roof surfaces of the piston crown (11.1), and having a fuel injection nozzle (8) opening into the cylinder (1) near the inlet region of the gas intake ports (3) between the gas intake valves (6), wherein, measured in relation to the cylinder axis (5), the angle of the jet axis (9) of the fuel injection nozzle (8) is greater than the angle of the gas intake ports, and having an ignition device (14) arranged in the cylinder cover (2.1) close to the cylinder axis (5), and having a trough-shaped recess (12) which is provided in the piston crown (11.1) and is bounded by a trough base (12.1) and side walls (16) and which intersects the roof ridge (11.2) on the piston crown and extends over the region of both roof surfaces, the trough base (12.1) slopes towards the fuel injection nozzle (8) and ending in a wall zone (12.2) extending steeply upwards on its side facing the fuel injection nozzle (8), wherein the transition region (15) between the trough base (12.1) and the side walls (16) has a substantially barrel-shaped contour in plan view, which first widens on both sides from the gas exhaust side (4) and then narrows again towards the gas intake side, one end of which is formed by the wall zone (12.2) extending steeply upwards.

2. A reciprocating internal-combustion engine according to claim 1, characterised in that the trough base (12.1) has a planar surface and in that the side walls (16) defining the barrel-shaped contour adjoin the trough base (12.1) in a dish-shaped manner.

3. A reciprocating internal-combustion engine according to claim 1, characterized in that the end region (12.3), facing the gas exhaust side (4), of the trough-shaped recess (12) is wider than the end region (12.4) facing the gas intake side (3) and bounded by the steep wall zone (12.2).

4. A reciprocation internal-combustion engine according to claim 1, characterized in that the upper boundary contour of the two sides is substantially circular in plan view and extends at an angle of approximately 25°—measured in relation to the longitudinal axis of the trough-shaped recess—to the steep wall zone (12.2), the upper boundary edge (12.5) of which extends in a straight line.

5. A reciprocation internal-combustion engine according to claim 1, characterized in that the greatest width A of the upper boundary contour may be 1.8 to 1.9 times the width B of the trough in the end region located at the boundary edge (12.5).

6. A reciprocation internal-combustion engine according to claim 1, characterized in that the gas intake ports open at a flat angle of less than 45 degrees into the combustion chamber.

7. A reciprocation internal-combustion engine according to claim 1, characterized in that the trough base (12.1), slopes at an angle a of approximately 12° to the horizontal from the gas exhaust side towards the gas intake side.

8. A reciprocation internal-combustion engine according to claim 1, characterized in that a partition is arranged orientated transversely to the cylinder axis 5 in at least one gas intake port 3, the partition dividing the gas intake port 3 into an upper sub-port and a lower sub-port.

9. A reciprocation internal-combustion engine according to claim 1, characterized in that the end region (12.3), facing the gas exhaust side (4), of the trough-shaped base (12.1) slopes starting from the level of the outer upper edge of the piston crown.

10. A method of operating a reciprocating internal-combustion engine, having at least two gas intake ports (3) with gas intake valves (6), at least one gas exhaust port (4) with a gas exhaust valve (7) and at least one ignition device (14) per cylinder (1), and having a combustion chamber (1.1) formed by the cylinder cover (2.1) and the crown (11.1) of the piston (11), which is guided in the cylinder (1) in a reciprocating manner, into which combustion chamber the gas intake ports open at a flat angle of less than 45 degrees, measured in relation to the cylinder-head plane (2.1), wherein the piston crown (11.1) on the one hand and the cylinder cover (2.1) on the other hand are substantially roof-shaped in vertical section, wherein in each case one of the roof surfaces is associated with the gas intake valves (6) and the other roof surface is associated with the gas exhaust valve (7), and the orientation of the roof surfaces of the cylinder cover (2.1) corresponds to the orientation of the roof surfaces of the piston crown (11.1), and having a fuel injection nozzle (8) opening into the cylinder (1) near the inlet region of the gas intake ports (3) between the gas intake valves (6), wherein, measured in relation to the cylinder axis (5), the angle of the jet axis (9) of the fuel injection nozzle (8) is greater than the angle of the gas intake ports, and having an ignition device (14) arranged in the cylinder cover (2.1) close to the cylinder axis (5), and having a trough-shaped recess (12) which is provided in the piston crown (11.1) and is bounded by a trough base (12.1) and side walls (16) and which intersects the roof ridge (11.2) on the piston crown and extends over the region of both roof surfaces, the trough base (12.1) slopes towards the fuel injection nozzle (8) and ending in a wall zone (12.2) extending steeply upwards on its side facing the fuel injection nozzle (8), wherein the transition region (15) between the trough base (12.1) and the side walls (16) has a substantially barrel-shaped contour in plan view, which first widens on both sides from the gas exhaust side (4) and then narrows again towards the gas intake side, one end of which is formed by the wall zone (12.2) extending steeply upwards, so that in the vicinity of the piston crown, the tumble flow is first expanded slightly transversely to the flow direction, thereby slowed down slightly, and then consolidated again, thereby accelerated, immediately before the transition to the wall zone extending steeply upwards, which imparts turbulence to the tumble flow.

11. Method according to claim 10, characterized in that the combustion engine is operated in homogeneous operation.

12. Method according to claim 10, characterized in that the combustion engine is operated in stratified-charge operation.

13. Method according to claim 10, characterized in that the fuel jet (13) is picked up by the turbulent air flow, substantially without direct contact with the base of the recess (12), and consequently deflected towards the ignition device (14) by the side of the gas intake valves (6), forming an ignitable mixture in the tumble flow, and ignited.

* * * * *

UNITED STATES PATENT AND TRADEMARK OFFICE
CERTIFICATE OF CORRECTION

PATENT NO.          : 7,395,806 B2
APPLICATION NO.  : 11/438523
DATED                  : July 8, 2008
INVENTOR(S)         : Jorg Ballauf et al.

It is certified that error appears in the above-identified patent and that said Letters Patent is hereby corrected as shown below:

On the title page item (73) Assignee: "FEV Motorentechnik GmbH, Aachen (DE)" change to -- FEV Motorentechnik GmbH, Aachen (DE); Hyundai Motor Company, Seoul, (KR) --

Signed and Sealed this

Twenty-seventh Day of January, 2009

JOHN DOLL
*Acting Director of the United States Patent and Trademark Office*